(12) United States Patent
Wadhwa et al.

(10) Patent No.: US 6,389,588 B1
(45) Date of Patent: May 14, 2002

(54) METHOD AND SYSTEM OF BUSINESS RULE EXTRACTION FROM EXISTING APPLICATIONS FOR INTEGRATION INTO NEW APPLICATIONS

(75) Inventors: Vivek Wadhwa, Chapel Hill, NC (US); Len Erlikh, Brooklyn, NY (US); Ioan M Oara, Cary, NC (US); Andrey N. Terekhov, Sankt-Petersburg; Mikhail Bulyonkov, Morskoj, both of (RU)

(73) Assignee: Relativity Technologies, Cary, NC (US)

(*) Notice: Subject to any disclaimer, the term of this patent is extended or adjusted under 35 U.S.C. 154(b) by 0 days.

(21) Appl. No.: 09/245,002

(22) Filed: Feb. 4, 1999

(51) Int. Cl.⁷ .................................................. G06F 9/45
(52) U.S. Cl. ................................................ 717/2; 717/5
(58) Field of Search ................................ 717/4, 5, 8, 1, 717/2, 3; 707/6, 101; 705/1, 7; 703/25, 26, 27, 28

(56) References Cited

U.S. PATENT DOCUMENTS

| | | | | | |
|---|---|---|---|---|---|
| 5,119,465 A | * | 6/1992 | Jack et al. | ...................... | 703/27 |
| 5,414,847 A | * | 5/1995 | Tsukakoshi | ...................... | 705/1 |
| 5,488,714 A | * | 1/1996 | Skidmore | ...................... | 395/707 |
| 5,734,837 A | * | 3/1998 | Flores et al. | ...................... | 705/7 |
| 5,897,633 A | * | 4/1999 | Nolan | ...................... | 707/6 |
| 5,911,142 A | * | 6/1999 | Smith et al. | ................. | 707/101 |
| 5,956,499 A | * | 9/1999 | Colgan | ................... | 395/500.23 |
| 6,041,330 A | * | 3/2000 | Carman et al. | ............. | 707/101 |
| 6,151,702 A | * | 11/2000 | Overturf et al. | ................ | 717/5 |
| 6,208,345 B1 | * | 3/2001 | Sheard et al. | ................ | 345/356 |

OTHER PUBLICATIONS

El., "Post–2000 Tools", InformationWeek, Mar. 1998, pp 93–94.*
Moozakis, "COBOL Transformation Pack gains new functions", Internetweek, Dec. 1998, pp 14.*
Hanna, "Wanted: Hired hands to harvest legacy load", Software MAgazine, Feb. 1995, pp 39–43.*
Moriarty, "Business Rule management facility", Database Programming and Design, Sep. 1998, pp 10–13.*

* cited by examiner

Primary Examiner—Kakali Chaki
(74) Attorney, Agent, or Firm—A. Jose Cortina; Kilpatrick Stockton LLP

(57) ABSTRACT

A method of extracting and transforming a business rule which is a self contained section of legacy code focused on the computation of specific business policy includes identifying the business rule. Thereafter, the business rule code is located in the existing program and extracted in human readable code form. New code is generated for a new application for containing the business rule therein, and the new code is integrated into the new application. A system for extracting and transforming such business rules from existing programs such as legacy applications to a new application includes various components for achieving the various noted steps.

26 Claims, 4 Drawing Sheets

```
001683*
001684  IF  GSS1003-FUNCTION-CODE-I = 'AA'
001685  OR GSS1003-FUNCTION-CODE-I = 'TM'
001686  OR GSS1003-FUNCTION-CODE-I = 'OH'
001687          MOVE SPACE TO GSS1003-MGS-LINE-O
001688          MOVE '** FUNCTION NOT OPERATIONAL AT THIS TIME'
001689                          TO GSS1003-MGS-LINE-O
001690          MOVE -1 TO GSS1003-FUNCTION-CODE-L
001691          PERFORM U150-SEND-MAP-DATAONLY.
001692*
001693  C140-NEXT-PROGRAM-EXIT. EXIT.
001694*
        ************************************************************
        * CALCULATE DAY OF WEEK FROM MONTH, DAY1, YEAR TO DOW       *
        ************************************************************
        CALCULATE-DAY-OF-WEEK                   SECTION.
            MOVE 31 TO tt of MONTHES ( 1 ).
            MOVE 29 TO tt of MONTHES ( 2 ).
            MOVE 31 TO tt of MONTHES ( 3 ).
            MOVE 30 TO tt of MONTHES ( 4 ).
            MOVE 31 TO tt of MONTHES ( 5 ).
            MOVE 30 TO tt of MONTHES ( 6 ).
            MOVE 31 TO tt of MONTHES ( 7 ).
            MOVE 31 TO tt of MONTHES ( 8 ).
            MOVE 30 TO tt of MONTHES ( 9 ).
            MOVE 31 TO tt of MONTHES ( 10 ).
            MOVE 30 TO tt of MONTHES ( 11 ).
            MOVE 31 TO tt of MONTHES ( 12 ).

MOVE 366 TO NUMOFDAYS.

MOVE 6 TO REM.
            MOVE 7 TO CURDAY.
            MOVE 12 TO CURMONTH.
            MOVE 1996 TO CURYEAR.
            move 1 to direction.

IF YEAR > 2099 OR YEAR < 1600 THEN
              MOVE "WRONG MONTH" TO DOW1
            ELSE
            IF MONTH > 12 OR MONTH < 1 THEN
                MOVE 'WRONG MONTH" TO DOW1
            ELSE
                MOVE year TO tmp1
                PERFORM ISV IF DAY1 > tt of MONTHES ( MONTH ) OR DAY1 < 1 THEN
                    MOVE "WRONG DAY" TO DOW1
                ELSE
                    PERFORM MAINCALC.

MOVE DOW1 TO DOW.
```

FIG. 2

METHOD AND SYSTEM OF BUSINESS RULE EXTRACTION FROM EXISTING APPLICATIONS FOR INTEGRATION INTO NEW APPLICATIONS

CROSS REFERENCE TO RELATED APPLICATIONS

This application is related to copending application (Attorney Docket No. 37229/186694) entitled "Method And System For Recreating A User Interface Of An Existing Application Text Based User Interface Into A Graphical User Interface", which was concurrently filed with this application.

FIELD OF THE INVENTION

The invention relates to a method and system for extracting and transforming business knowledge from existing applications to new applications to be deployed on the same and/or new platforms.

BACKGROUND OF THE INVENTION

Legacy systems are software applications that have been written some time ago and which do not conform or are not usable on new or modern software platforms. For example, a legacy system or application is any system or application implemented and used by a company for a number of years and which became an integral part of running the business. More specifically, it is a system which persists in use over a large turnover of managers of the system. Such systems or programs run fine, but each new manager has less knowledge of the system or program as time progresses. Examples of such legacy systems include mainframe programs written in COBOL, PL/I, and C. Such programs typically contain a great deal of business knowledge. It is often desirable to extract the business knowledge for implementation into a new application on more modern platforms. Examples of such modern platforms are Java, C++, or Visual Basic.

For purposes of the invention, a "business rule" is a self contained section of legacy code that is focused on the computation of a specific business policy expressed by a computation of value of a single or group of variables or, alternatively, by establishing an outcome of a specific business decision. Typical examples of such business rules include calculation of a bond's yield to maturity, determination of employment status, approval of loan eligibility or fulfillment of graduation requirements. Business rules can be described or defined at different levels, with a business rule often being composed of multiple business rules where it may become desirable to extract a higher level business rule, or one of the lower level business rules of a multiple number of business rules making up the higher level business rule. For example, a higher level business rule may be a subroutine that a banking system uses to qualify a user and determine a customer's mortgage. Such a higher level business rule can include lower level business rules such as the analysis done to determine whether: (1) the customer qualifies; (2) the availability of second mortgages; (3) determining whether based on customer data the customer merits a premium account; and/or (4) what is the best mortgage for the customer based on customer data. Thus, based on this description, it would be readily apparent to those of ordinary skill in the art what is intended by the term "business rule" as used herein.

It is well known that such business rules in legacy applications can be scattered throughout the entire program, and are most likely mixed in with other pieces of program logic. Further, under a typical legacy system, the mission critical business logic, or "business rules" therein are neither well documented nor easy to understand. The process of rediscovery is typically painful and costly, and once the legacy application, e.g., COBOL-based, "business rule" is isolated, the conversion of monolithic procedural code into a modern program language such as Java and the like must be dealt with in a manner which results in understandable hierarchies.

Thus, in implementing "business rules" from legacy applications in modern programs and platforms, the business rule must first be identified. One example of such an identification involves the end user of a COBOL program. Such an end user knows that the COBOL program does a value calculation that kicks off a sales process. Specifically, the program determines how often customers should be called based on the specific set of product lines they own. No one knows the basis on which the calculation is made. This may be identified as a "sales call rule" and is thus an ideal candidate for extraction as its own modular object. In accordance with the necessary steps to be taken to find and extract such a business rule, the rule in the legacy source code must be located and extracted as a self contained routine. If the legacy code is well structured, the extraction of a business rule may be as simple as "cut and paste". However, most legacy code presents a number of challenges because such a rule can be scattered, for example, in a program of approximately 4,000 lines of code or more.

Thus, in accordance with the invention, the problems of meticulous and burdensome searching through legacy code to identify and extract a business rule for implementation on modern platforms and in modern applications is avoided in accordance with the method and system of the invention.

SUMMARY OF THE INVENTION

The invention is directed to a method of extracting and transforming a business rule from an existing program, typically a legacy application, to a new and more modern application, existing on the same or new platforms. For example, an existing application based on COBOL, PL/I, or C is transformed into a new application based on the same language or new application based on Java, C++, or Visual Basic. The method includes the steps of identifying the business rule. Thereafter, the business rule code in the existing program is located and extracted in human readable code form, for example, source code, from the business rule code in the existing program. New code is generated for the new application, which contains the business rule therein. For example, such code can be generated by a translator or a code generator, which is conventional and well known to those of ordinary skill in the art. Thereafter, the code containing the business rule, which has been newly generated is integrated into the new application for implementing the business rule as part of the new application. Programs for conducting such integration of code are also conventional and well known to those of ordinary skill in the art. For example, such code can be integrated by a compiler, which is conventional and well known to those of ordinary skill in the art.

In a more specific aspect, the business rule code is located in the existing program through the use of a graphical editor such as those that are readily commercially available. The business rule code is identified and located by identifying the business rule's point of origin and/or the boundaries in the existing program using the graphical editor. More specifically, for purposes of this disclosure, "point of origin" are places in the program where the business rule originates. For example, such points in the program is where the data goes into and out of the program. Boundaries define which portions of the program functionality to exclude from the business rule. Thus, with the graphical editor, a user can point to a variable in a place in the program and specify at what point to extract the code after analysis of the code.

For purposes of this disclosure, a typical graphical editor which can be used is the graphical editor program sold under the name Hyperview™ by Relativity Technologies of Cary, North Carolina as part of its RescueWare™ software offering. While specific reference to product tools has been made, implementation of the invention is not limited to those tools. Any conventional tool developed, or easily developed, for example, a syntax based editor can be used in place of the noted tool. For purposes herein, a syntax based editor is an editor that recognizes particular syntax constructs of a language. For example, such an editor may display an outline of the program or it may colorize verbs and variables in different colors. Another example of such a tool is one marketed and made available under the name Visual Developer Studio 97™, available commercially from Microsoft Corporation of Redmond, Washington.

In recognition that a business rule can be made up of multiple separate business rules, for example, as in the case where a mortgage calculation will vary from state to state, such a business rule may be made up of: (1) a business rule outlining how the mortgage calculation is generally performed; and (2) a second business rule adjusting the mortgage calculation for a specific state. In such a case, a blocking technique can be used which is made up of backtracking through the existing code using the graphical editor to extract only the portions of the existing code making up the portions of the business rule desired to be extracted. Thus, by specifying blocking points, blocking allows the business rule extraction to stop the backtracking of the calculation at certain predetermined points selected by the user. Such blocking can be established as being of two types. The first type is known as generic blocking and stops the business rule extraction process at some given statement types, for example, at any "input/output" statement. A second type of blocking known as specific blocking stops the business rule extraction process at some statements which are predetermined and specified by the user.

In another aspect, the invention relates to a system for extracting and transforming a business rule from an existing program to a new application. The system includes means for identifying and locating business rule code in the existing program. Such means for identifying and locating the business rule code in the existing program can be, for example, as previously noted, a graphical editor or a subroutine thereof. Similarly, means for extracting the business rule in the human readable code form from the business rule code in the existing program is provided, and such means can be, for example, a second subroutine of a graphical editor program. Means for generating the code for the new application for containing the business rule therein is also provided, and can be, for example, a translator or code generator. Further, means for integrating the code for the new application is provided. Such means can be one of several conventional and well known programs used to integrate code into application programs such as a compiler, as will be readily apparent to those of ordinary skill in the art.

BRIEF DESCRIPTION OF THE DRAWINGS

Having briefly described the invention, the same will become better understood from the following discussion, viewed with reference to the appended drawings, wherein:

FIG. 2 is a detailed view of a section of the business rule displayed in FIG. 1, with the business rule shown in bold form;

DETAILED DISCUSSION OF THE INVENTION

Having briefly described the invention, the following detailed discussion presents a specific implementation of the invention, for example, as in the case of extracting a business rule or many business rules from an existing legacy program, for example, a legacy program written in COBOL.

Figure 1:
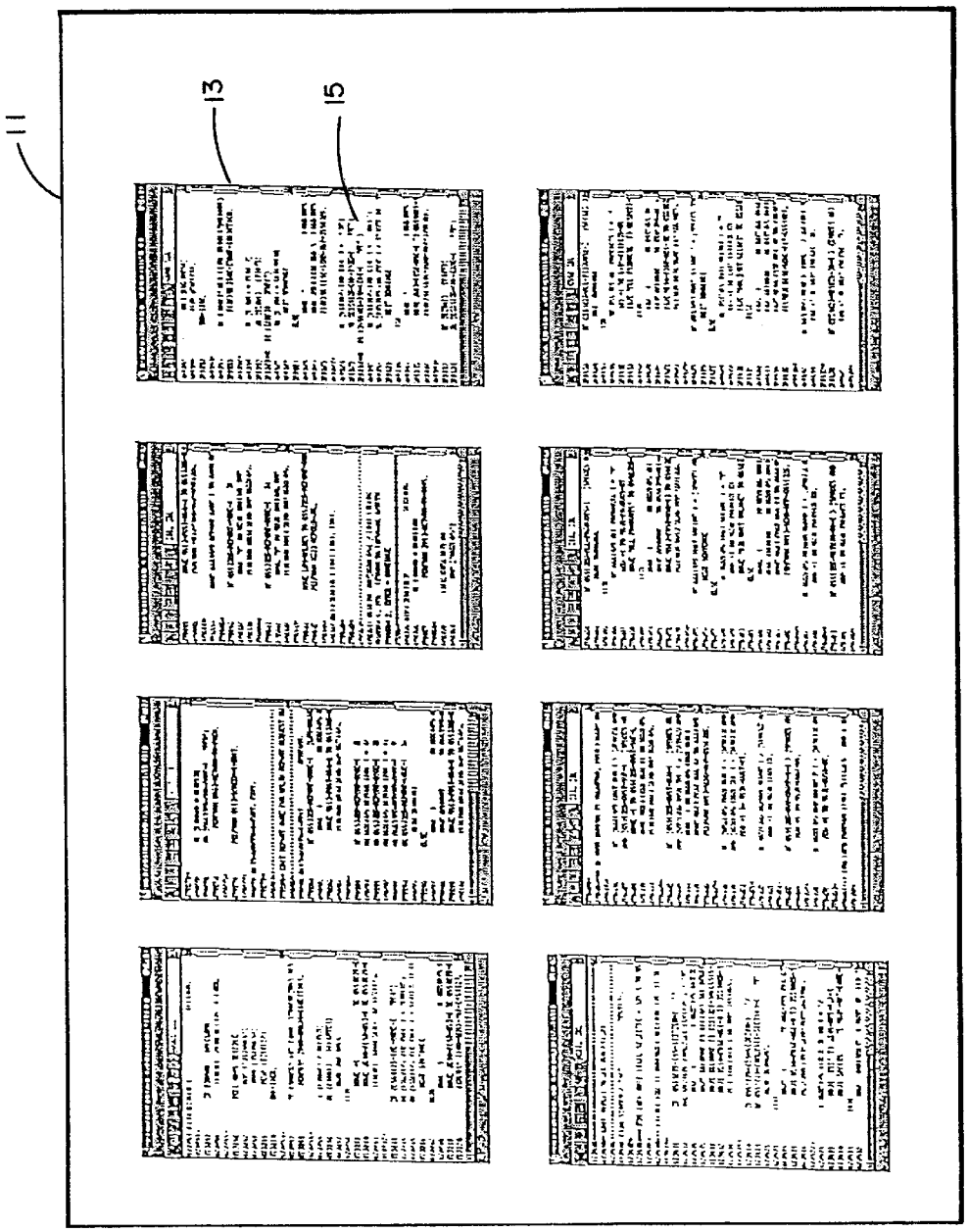
FIG. 1 is a view of a screen displaying in thumbnail form an existing application representing having a business rule scattered throughout.

FIG. 1 shows a thumbnail view of selected segments of a legacy program and a distribution of business rule related code, not generally identifiable as scattered throughout the program code.

In FIG. 1, the selected segments of the legacy program are shown in a display 11 such as that of a computer monitor. The display 11 displays individual windows 13 showing the legacy code 15 of interest.

As further shown in FIG. 2, the window 13, i.e., an individual window, shows a zoomed in view of a portion of the code segment 15 demonstrating in detail with the lines dealing with the business rule shown in bold, how scattered the business rule logic can be throughout the code. The business rule code has been automatically identified and made bold by analyzing the program code with a graphical editor as has been further described herein.

Figure 3:
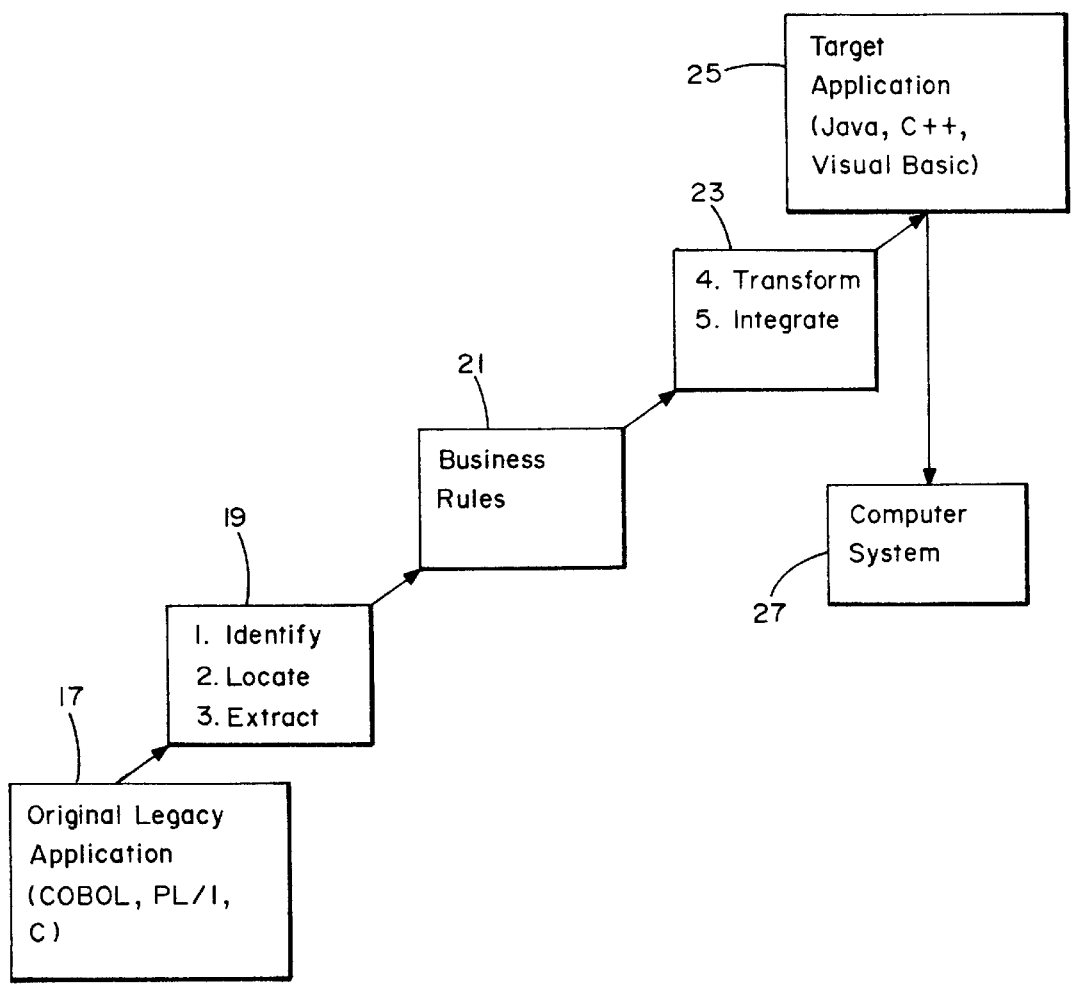
FIG. 3 is a block diagram illustrating the general steps of business rule extraction in accordance with the invention.

Thus, in general implementation, the method and system of the invention is implemented in accordance with FIG. 3 wherein the original legacy application 17 such as one written in COBOL, PLI, or C, is analyzed to identify, locate or extract the business rules at a step 19. The business rules 21 are then transformed and integrated at a step 23 into a target application, for example, an application written in Java, C++, other languages, including even COBOL, generally referred to by the number 25, which is deployed in a computer system 27 which can be a standalone system or a distributed environment. Generally, as previously discussed, the process of business rule extraction includes the steps of identifying the existence of the business rule, locating the business rule in the legacy code, extracting the business rule as an independent entity, transforming the business rule into the new platform language, and integrating the business rule into the new system.

Thus, as may be appreciated with reference to FIGS. 1 and 2, a business rule was scattered throughout a monolithic program and intertwined with other pieces of logic. More specifically, FIG. 2 shows a thumbnail view of how the business rule code 15 was scattered throughout the various pages of code. For example, in FIG. 2 the lines of code identified as being the business rule code used to calculate the variable DOW (day of the week) are shown in bold.

Another critical aspect of creating a self-contained routine is the need to identify and extract all pertinent variable declarations. If done manually, identification of all the variables is mechanical in nature. However, this task can be very laborious and error prone when a large number of variables are involved. Thus, the use of a graphical editor in the manner described herein can automate part of the problem of business rule extraction. Specifically, graphical analysis helps identify the lines in the program in which, for example, in day of week calculation, the final value of the program in which the final value of the day of the week variable is assigned. The lines of code involved are then extracted and organized into an independent program of a relatively small number of lines, for example, one hundred or less. The types of graphical editors which can be used have been previously described.

Thus, at this point, a fully functional business rule has been extracted from the code. The business rule can now be studied in COBOL and a functionally equivalent Java program to can be created therefrom.

In performing this aspect of business rule extraction, where COBOL is transformed to Java, common programming constructs are used toward decomposing the COBOL structures and translating COBOL paragraphs into Java methods. Specifically, COBOL typically has a heavy use of initialized hierarchical variables that resemble structures in newer languages. Using this similarity, the COBOL variables can be converted into separate Java classes, with constructs to set values appropriately. The COBOL language business orientation means that the vast majority of systems deal with data and processes to manipulate that data. This model fits well within a data-centric approach to redefining the system around the variables. In the example given, the resulting Java translation involves only two classes. However, even this transformation may involve significant effort and there are issues that must be understood to achieve valid working Java code. The problems include declared data conversions and control flow issues.

With respect to data conversion, COBOL typically has a heavy use of hierarchical variables that resemble structures and, classes in the newer languages. Thus, care must be taken when translating declared COBOL data types such as two-digit numbers, which must be natively translated or emulated through other Java classes depending on the final underlying logic implemented.

With respect to the business-rule integration, modern Java environments provide a great deal of flexibility for adopting the newly re-deployed business rule to work with a variety of distribution mechanisms. Once the logic is translated, a decision is made on how to integrate the resulting Java business rule into the new system. There are numerous ways in which the extracted business rules could be used, for example, the calculation which previously existed as a part of the underlying COBOL business logic, can now be included in a HTML page and distributed on request. In this matter, one can create a Java applet, in a manner which is conventional and well known to those of ordinary skill in the art once the invention as disclosed herein is known.

Thus having described specific implementations, it becomes apparent that the process of the business rule identification is an analytical exercise based on the end user interviews, peer discussions, and automated tool-assisted system analysis. Once the business rule has been identified, the rule is located in the legacy source code. Most importantly, the business rule code is identified and located by identifying the business rule's point of origin and boundaries in the existing program using the graphical editor. More specifically, as previously noted, for purposes of this disclosure, "point of origin" are places in the program where the business rule originates. By "boundaries" is meant the specification defining which portions of the program's functionality to exclude from the business rule. For example, a point of origin is such a point in the program where the data goes into the program. The determination of a business rule's point of origin depends on a subsequently used business rule extraction technique.

In this case, the most frequently used business rule extraction techniques are variable-based, value-based specialization, and system-wide. The variable based extraction approach is designed to identify an algorithm for computation of a single or group of variables at given boundaries in the program. Generic and specific blocking techniques can be used to limit the size of the extracted code segment. The value-based specialization extraction is based on reducing the program's source to a specific program execution path based on a given value of a variable. A refinement of this technique is based on multiple variables, ranges of values, and modification of a calculation statement. A system-wide approach extends the above two techniques to be applied to a related collection of legacy programs in a single application. A special consideration is given to automation of the above extraction processes in creation of the extracted business rule sources that are functionally complete and are syntactically and semantically correct. This includes identification and extraction of all pertinent variable declarations.

Thereafter, the business rule is transformed in a process of translating, as described previously, an extracted business rule from its original language, e.g., COBOL, PL/I, and C, into a new language of choice, e.g., Java, C++, Visual Basic and/or COBOL. The translated business rule is syntactically and semantically correct as further described herein, and accurately captures the business behavior of the legacy application. The business rules can then be further enhanced in the target integrated development environment to reflect new business requirements. Finally, transformed business rules are integrated into new applications. Component object models, like CORBA, COM/DCOM and Enterprise Java Beans are best suited for wrapping business rules to be plugged into modern technical infrastructure.

Figure 4:
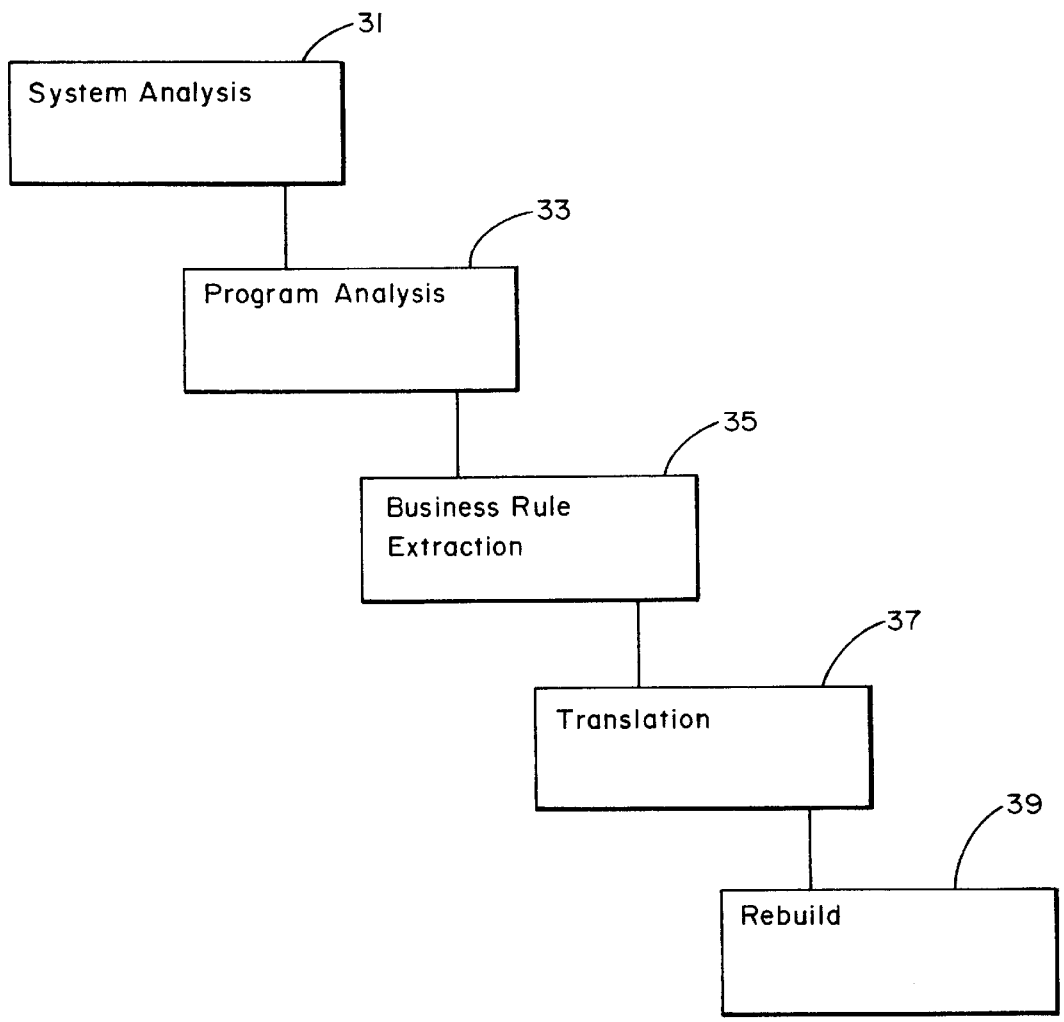
FIG. 4 is a process flow diagram illustrating how business rule extraction is achieved in accordance with the invention.

Thus, the process of the invention is further illustrated in the process flow diagram of FIG. 4 which illustrates how business rule extraction is achieved in a sequential manner in accordance with the invention.

An initial step 31 of system analysis using a software tool, such as the previously noted RescueWare™ from Relativity Technologies from NC, or others such as previously discussed as being commercially available from other vendors, is conducted to automatically build a number of diagrams, including, CICS Flow (connections between programs, transactions and screens), Data Flow (connections between programs and files), and Call Map (connections between program calls). These diagrams allow the user to understand the functionality of the legacy application at a very high level.

Thereafter, program analysis is conducted at a step 33 through the use of a graphical editor, such as the previously discussed Hyperview™ graphical editor or other like graphical editor, to allow the user to analyze the programs and find relevant business rules. Thus, using such a graphical editor, the user can see relationships between various elements of the program, for instance, the user can see all instances of a variable usage, the data structure used in a "Write" or a "Read" statement, or all "IF" statements that use a particular variable. In addition, using the graphical editor, the user can see a diagram of calls between program paragraphs. The user can also see a tree view of the divisions, sections, paragraphs and statements in a legacy application. e.g., in a COBOL program, and can see various execution paths in the program.

As noted previously, while the HyperView™ tool has been mentioned, any tool used for conducting deep analysis of a program will suffice. Specifically, with such a tool a user can specify the types of things to look for. An alternative useful tool for such purposes can be, for example, the system analysis tool commercially available as originally marketed under the name Revolve™ by the Burl Co. and currently marketed by and available from Microfocus, Inc. Such a tool allows analysis of a legacy application at the system or program level. By analysis is meant understanding the attributes of components in the system and the relationship between various components.

Thus, at step 35, the business rule extraction results in a COBOL program which performs a particular business function of the original program. This resulting COBOL program, as discussed previously, must satisfy two conditions. The program must be syntactically correct. This means that it must compile correctly. The program must also be semantically correct. This means that it must perform exactly the same function as in the original program.

Thus, in order to properly execute a business rule extraction in accordance with step 35, the user performs the following functions. As a result of analysis, a statement and one or more variables whose calculation forms the object of the business rule is selected. The blocking points are specified. Blocking allows the business rule extraction to stop the backtracking of the calculation at certain predetermined points selected by the user. As discussed previously, there are two types of blocking. Generic blocking stops the business rule extraction process at some given statement types (for example, at any SELECT statement). Specific blocking stops the business rule extraction process at some statements predetermined by the user. The name of the COBOL program which represents the extracted rule is then specified as are the names of the structures which form the input and output parameters of the business rule.

The COBOL program representing the business rule has two data structures as parameters. The first is a collection of all data elements which go into the calculation. The second is a collection of all data elements that are calculated in the business rule.

Thereafter, the step of translation 37 of the legacy programs, i.e., COBOL programs, which are the result of business rule extractions is conducted. Such new programs can be translated to C++, Java or Visual Basic in a conventional manner. They can be built into executable programs, or dynamic link libraries (DLL), ActiveX components or Java applets. When executed in any one of these forms, the translated code will take the same inputs and calculate the same outputs, in the same way as the original legacy program.

Finally, the rebuild step 39 is conducted. The components resulting from the translation step 37 may be included in the transformed application or in any other application. In particular, they may form the methods of the newly defined class, in an object oriented application.

Having thus specifically described the invention, the same will become better understood from the appended claims, in which it is intended to be set forth in a nonlimiting manner.

What is claimed is:

1. A method of extracting and transforming a business rule from an existing program to a new application, comprising:
   identifying the business rule;
   locating all of the code making up the business rule code in the existing program, and backtracking through the existing code to extract only the portions of the existing code making up the portions of the business rule desired to be extracted;
   extracting the business rule in human readable code form from the business rule code in the existing program;
   generating code for the new application containing the business rule therein; and
   integrating the code containing the business rule into the new application.

2. A method as in claim 1 further comprising locating the business rule code by analysis with a graphical editor.

3. A method as in claim 2 further comprising locating the business rule code by identifying points of origin and boundaries of the business rule code in the existing program.

4. A method as in claim 3 further comprising locating all of the code making up the business rule, and backtracking through the existing code to extract only the portions of the existing code making up the portions of the business rule desired to be extracted.

5. A method as in claim 1 wherein the existing program is written in COBOL, PL/I or C.

6. A method as in claim 1 wherein said generating of code in the new application comprises generating code in C++.

7. A method as in claim 1 wherein said generating of code in the new application comprises generating code in Java.

8. A method as in claim 1 wherein said generating of code in the new application comprises generating code in Visual Basic.

9. A method as in claim 1 wherein said generating of code in the new application is conducted in a manner integrating the business rule as a component object.

10. A method as in claim 1 wherein said generating code in the new application creates a dynamic link library.

11. A method as in claim 1 wherein said generating code in the new application creates a Active X component.

12. A method as in claim 1 wherein said generating code in the new application creates a Java applet.

13. A system for extracting and transforming a business rule from an existing program to a new application, comprising:
   means for identifying and locating business rule code in an existing program and for backtracking through the existing code to extract only the portion of the existing code making up portions of the business rule desired to be extracted;
   means for extracting the business rule in human readable code form from the business rule code in the existing program;
   means for generating code for the new application for containing the business rule therein; and
   means for integrating the code for the new application into the new application.

14. A system as in claim 13, wherein said means for identifying and locating business rule code, further comprises a graphical editor configured for conducting analysis for locating all of the business rule code in the existing program, and for identifying points of origin and boundaries of the business rule code in the existing program.

15. A system as in claim 13 wherein said means for identifying and locating comprises a first routine of a graphical editor program.

16. A system as in claim 15 wherein said means for generating code for the new application is one of a translator and code generator program.

17. A system as in claim 13 wherein said means for extracting comprises a second routine of a graphical editor.

18. A system as in claim 15 wherein said means for generating code for the new application is one of a translator and code generator program.

19. A system as in claim 13 wherein said means for generating code for the new application is one of a translator and code generator program.

20. A method of extracting and transforming a business rule from an existing program to a new application, comprising:

identifying the business rule;

locating all of the business rule code in the existing program by analysis with a graphical editor, identifying points of origin and boundaries of the business rule code in the existing program, and backtracking through the existing code to extract only the portions of the existing code making up the portions of the business rule desired to be extracted;

extracting the business rule in human readable code form from the business rule code in the existing program;

generating code for the new application containing the business rule therein; and integrating the code containing the business rule into the new application.

21. A method as in claim 20 wherein the existing program is written in COBOL, PL/I or C.

22. A method as in claim 20 wherein said generating of code in the new application comprises generating code in C++.

23. A method as in claim 20 wherein said generating of code in the new application comprises generating code in Java.

24. A method as in claim 20 wherein said generating of code in the new application comprises generating code in Visual Basic.

25. A method as in claim 20 wherein said generating of code in the new application is conducted in a manner integrating the business rule as a component object.

26. A method as in claim 20 wherein said generating code in the new application creates a dynamic link library.

* * * * *